UNITED STATES PATENT OFFICE.

CHARLES B. ROCKWOOD, OF INDIANAPOLIS, INDIANA.

COMPOSITION OF MATTER FOR COVERING WALLS, &c.

SPECIFICATION forming part of Letters Patent No. 542,173, dated July 2, 1895.

Application filed March 2, 1895. Serial No. 540,385. (No specimens.)

*To all whom it may concern:*

Be it known that I, CHARLES B. ROCKWOOD, a citizen of the United States, residing in the city of Indianapolis, Marion county, State of Indiana, have invented certain new and useful Improvements in the Composition of Matter for the Covering of Walls and other Surfaces; and I do declare the following to be a full, clear, and exact description of the invention, such as will enable others skilled in the art to which it appertains to make and use the same.

My composition consists of the following ingredients, combined in substantially the proportions as follows, viz: lime, fifty to three hundred pounds; oxide of zinc, twenty to one hundred pounds; sulphate of magnesia, ten to eighty pounds; borax, ten to fifty pounds; sugar, twenty to one hundred pounds; marl, one hundred to five hundred pounds. Each of the above ingredients is previously reduced to a more or less degree of fineness, and they are brought together and mixed and mingled thoroughly in a dry state. I then take from ten to fifty pounds of the mixture so formed and mix and mingle the same thoroughly with from one hundred to five hundred pounds of calcined gypsum, to which during said operation may be added sharp clean sand, ground marble, or sandstone, from one hundred to one thousand pounds. I then add water in quantity sufficient, upon further mixing, to reduce the mass to the desired plasticity, and apply it to the required surface by means of a trowel or cast it into molds.

The product secured by mixing the lime, oxide of zinc, sulphate of magnesia, borax, sugar, and marl with the calcined gypsum and water produces a cement of superior hardness, tenacity, adhesiveness, durability, and fire and water proofing qualities, capable of being wrought to an extra degree of smoothness of surface and which is very plastic.

The addition of sand is for the purpose of securing quantity with economy, and certain artistic effects in color are obtained by substituting for the sand the marble and sandstone mentioned.

The length of time in which the cement shall set is wholly with the control of the operator and depends upon the proportions used. For example, the effect produced upon calcined gypsum by borax is to quicken its setting properties, while the effect of sugar is to retard the same, and by varying the proportions of sugar and borax one is enabled to produce a cement by the aid of the other ingredients named of the desired period for setting, hardness, toughness, and tensile strength, according to the object in view.

The product made as described may safely be applied to iron, stone, wood, brick, or tile surfaces, and receive and retain a polish.

I am aware that lime, calcined gypsum, and water have been used to form a finish-coat for plastering purposes, that borax and gypsum are used to produce a cement; but I am not aware that lime, oxide of zinc, sulphat of magnesia, borax, sugar, marl, calcined gypsum, and water, with or without sand, have been employed to produce a cement to be used as a mortar.

What I claim, and desire to secure by Letters Patent of the United States, is—

The herein described composition of matter to be used as a cement for the covering of walls and other surfaces, and for casting into molds, consisting of lime oxide of zinc, sulphate of magnesia, borax, sugar, marl, calcined gypsum and water in proportion and union substantially as specified.

In testimony whereof I affix my signature in the presence of two witnesses.

CHARLES B. ROCKWOOD.

Witnesses:
H. A. MCGAFFEY,
GEO. A. PEGG.